INVENTORS
Don A. Kramer
Richard A. Kraft
BY Mueller & Aichele
Attys.

VERTICAL DEFLECTION CIRCUIT

Original Filed Jan. 4, 1960 2 Sheets-Sheet 2

INVENTORS
Don A. Kramer
BY Richard A. Kraft
Mueller & Aichele
Attys.

United States Patent Office 3,200,289
Patented Aug. 10, 1965

3,200,289

VERTICAL DEFLECTION CIRCUIT

Don A. Kramer, Rolling Meadows, and Richard A. Kraft, Palatine, Ill., assignors to Motorola, Inc., Chicago, Ill., a corporation of Illinois Continuation of application Ser. No. 162, Jan. 4, 1960. This application Apr. 12, 1963, Ser. No. 272,804
15 Claims. (Cl. 315—27)

Figure 1:
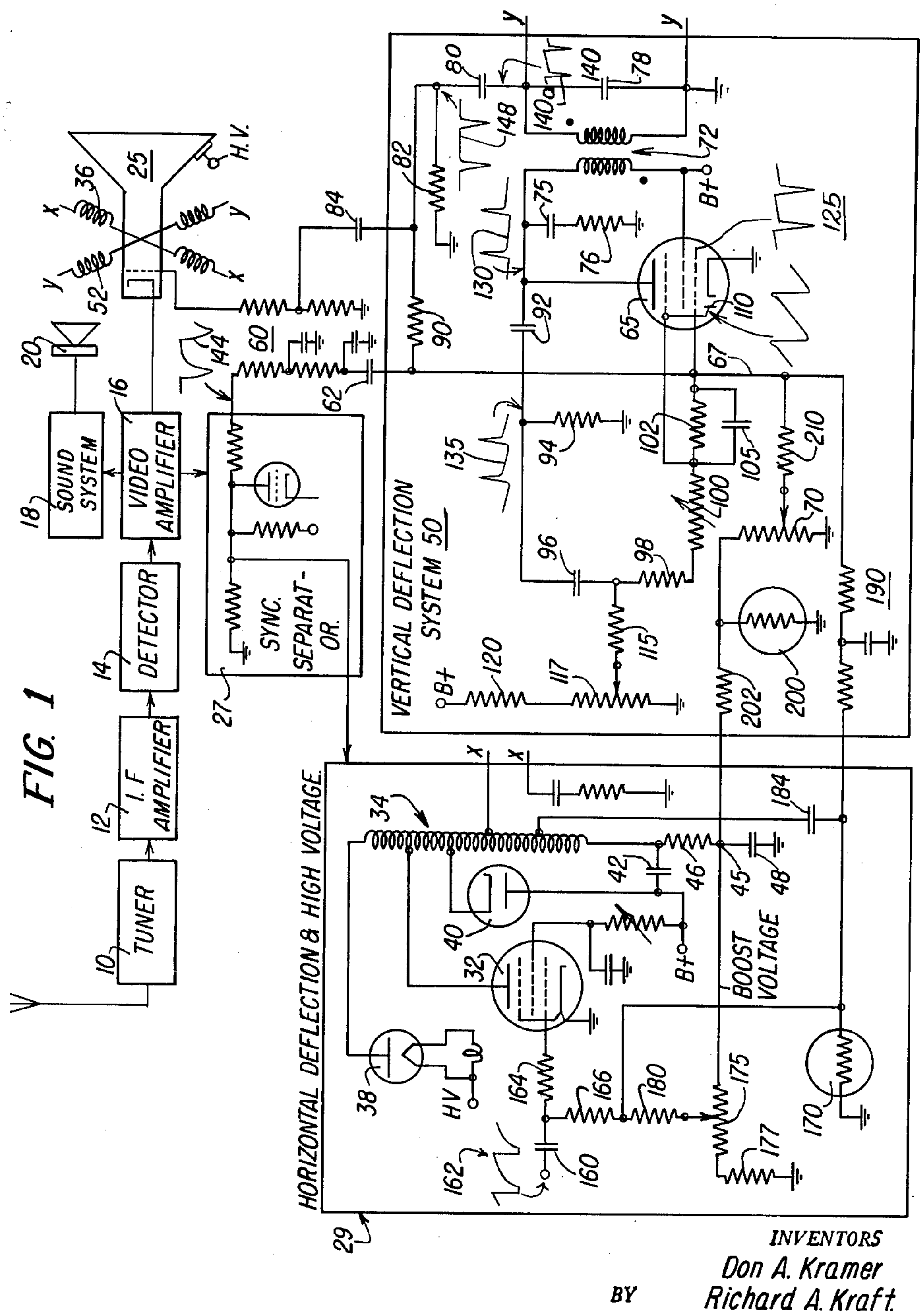

This invention relates to sawtooth signal generators and more particularly to a signal generator suited for use in the vertical deflection system of a television receiver.

This application is a continuation of copending application Serial Number 162, filed January 4, 1960, and now abandoned.

Considerable attention has been directed to a reduction of the cost and improvement of the performance of beam deflection systems for use with a cathode ray tube, particularly those as used in television receivers. While some simplification and cost improvement has taken place in the past, most practical present day sweep systems require at least two vacuum tubes. One tube vertical or frame sweep systems for television receivers have been known but these have not been altogether satisfactory from the standpoint of efficiently producing a suitable waveform under desirable operating conditions for the vacuum tube.

An object of the present invention is to provide an improved single tube deflection system for a television receiver.

Another object is to reduce the cost and to simplify the production of a sawtooth signal generator.

A further object is to increase the efficiency and improve the signal waveform in a sweep signal generator which requires a minimum of component parts and adjustable controls.

A still further object is to generate sawtooth beam deflection signals having desirable linearity and independence of variation in circuit parameters, caused, for example, by changing of components or voltage changes in the system, and to further include controls for the system which are comparatively independent of one another.

One feature of the invention is the provision of a sawtooth signal generator having an electron valve with a control electrode coupled to a degenerative feedback network to form an operational amplifier for the trace portion of the signal and also including a regenerative feedback network connected to the control electrode to make the system self-oscillating during the retrace portion of the signal so that effective of the generated signal may be obtained at the relatively sensitive control electrode of the electron valve.

A further feature is the provision of such a signal generator having an electron valve coupled as an operational amplifier and having a waveform charging capacitor network connected between output and input electrodes of the valve and a generator control network connected to the input electrode, with these networks separated by an isolating network at the input electrode and the capacitor network connected to a recharging diode for recycling the charging capacitor network.

Still another feature is the provision of a sweep signal generator, such as described in the preceding paragraph, wherein the electron valve is a pentode having a diode anode retained by the suppressor grid supporting structure in the tube so that this anode functions with the pentode cathode to form a tube for use in a single tube sweep system.

Still another feature of the invention is the provision of a vertical deflection system for a television receiver including an electron valve having a resistor-capacitor network coupled to the control grid for regulation of the signal wave, for example as to shape, frequency and amplitude, and which system further has a voltage sensitive network for maintaining wave signal size upon change of power supply voltage.

Figure 2:
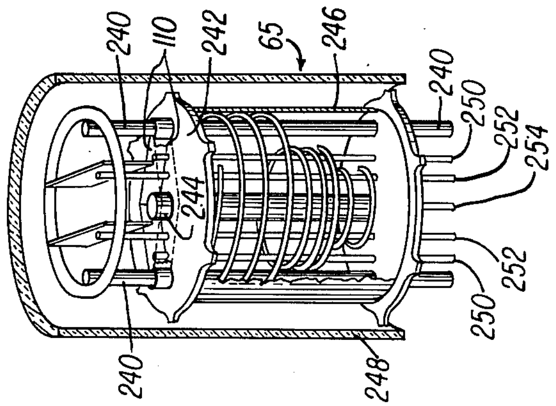
Figure 3:
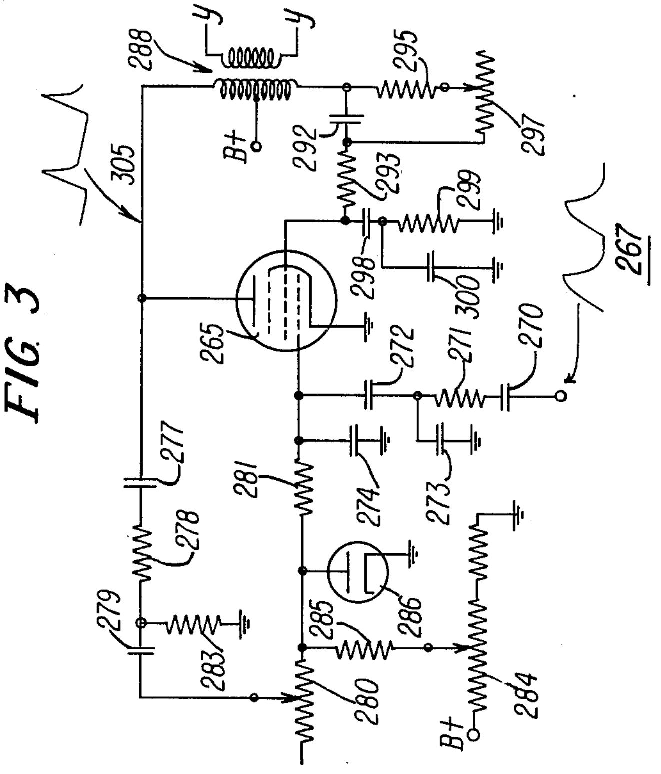

In FIG. 1 there is shown a schematic diagram illustrating the signal generator as used with a television receiver;

FIG. 2 is a partial sectional view of a portion of a vacuum tube especially adapted for use with the invention; and FIG. 3 is a schematic diagram of a modified form of the circuit of FIG. 1.

In a particular form of the invention, a single vacuum tube forms the active element in the vertical or frame sweep system for a television receiver. The circuit includes a capacitor network connected between the anode and control grid so that the circuit functions as an operational or feed-back amplifier during the trace portions of the sawtooth signals. The output signals are derived in a transformer and a resistor-capacitor network coupled to the transformer, which may comprise the retrace blanking network of the receiver system, provides regenerative feedback of a voltage pulse to the control grid for recycling of the system during the retrace portion of the generated signals. An isolating network is coupled between the degenerative and regenerative networks at the control grid and during retract the vacuum tube is cut off while a diode provides a recharging path for the capacitor means of the degenerative feedback network. The diode is preferably incorporated with the suppressor grid structure of the vacuum tube. Synchronizing signals of a received television signal may be applied to the control grid and suitable adjustable potential dividers are coupled to the control grid to serve the functions of frequency, or hold, control and size control. The size control potential divider may include a bias network for the vacuum tube and means for sensing power supply voltage change in order to maintain vertical signal size or a given aspect ratio during changes in power supply voltage caused, for example, by variation of the line voltage used to operate the receiver.

*General description*

In FIG. 1 there is shown a television tuner 10 which selects a standard television signal and converts this to one of intermediate frequency for further amplification and selection in the IF amplifier 12. Amplifier 12 is connected to the detector 14 which derives the modulation of the signal. The demodulated signal is then applied to the video amplifier 16 which applies a sound subcarrier to the sound detector and amplifier system 18 for detection and reproduction of the audio by speaker 20.

The video amplifier 16 is also coupled to the cathode of the cathode ray picture tube 25 to apply the video signals thereto. Synchronizing signals for both the line and field sweep systems are coupled to the synchronizing signal separator circuit 27 from the video amplifier 16, and circuit 27, operating in accordance with known principles, provides synchronizing pulses for the horizontal or line deflection system 29.

System 29 includes a suitable oscillator circuit (not shown) operative at 15.75 kc. in order to control the horizontal output tube 32. The horizontal output transformer 34 is coupled to tube 32 and current sawtooth deflection signals at the line frequency are developed in transformer 34 and applied by leads X—X to the line deflection winding 36 of the deflection yoke for the picture tube 25. A portion of the energy in transformer 34 is rectified by diode 38 and used as a high voltage for the screen of picture tube 25.

The horizontal deflection circuit 29 further includes a damper diode 40 which is coupled between a tap of transformer 34 and B+ for recovery of a portion of the energy developed in this circuit in accordance with present day television practice. So-called bootstrap capacitor 42 is coupled between B+ and the high potential end of the winding of transformer 34 so that this capacitor is effectively charged to the boost or bootstrap potential rectified by diode 40 and this boost potential is available at point 45 which is the junction of filter resistor 46 and filter capacitor 48 coupled between capacitor 42 and ground. The potential appearing at point 45 may be of the order of 500-600 volts and is available for use in certain portions of a television receiver of this type.

The synchronizing signal separator circuit 27 is also coupled to the vertical sweep system 50 in order to provide frame control in accordance with the received signal. The circuit 50 develops suitable sawtooth deflection signals at terminals Y—Y which are interconnected to the terminals Y—Y of the vertical deflection winding 52 of the deflection yoke for the picture tube 25.

*Circuit description of FIG. 1*

Vertical synchronizing signals applied from the circuit 27 through the integrating network 60 and the coupling capacitor 62 to the control grid of the pentode vacuum tube 65. A direct current bias for the control grid of tube 65 is applied thereto by way of lead 67 and the network developing this bias will be discussed in more detail subsequently. For present purposes it may be noted that the bias voltage will be developed with respect to ground, the cathode of tube 65 being connected directly to ground, and that this voltage will be variable by means of a potentiometer 70 which is effectively a vertical size control for the signal generating system as used in the television receiver.

The anode of tube 65 is coupled through the primary of output transformer 72 to B+. The screen grid of tube 65 is connected directly to B+. A damping network including series coupled capacitor 75 and resistor 76, is connected between the anode of tube 65 and ground to reduce spurious ringing signals at the start of a trace or scanning wave. The secondary winding of output transformer 72 is connected to the vertical deflection winding of the yoke and this is shunted by a capacitor 78 which reduces the effect of line deflection signals picked up by the yoke. One side of the secondary winding of transformer 72 is signal grounded. The other side of the secondary winding of transformer 72 is connected to capacitor 80 which is series coupled with resistor 82 to ground. At the injunction of capacitor 80 and resistor 82 there is developed a negative going voltage spike or pulse which is applied through capacitor 84 to the control grid of picture tube 25 in order to cut off this tube or blank the picture during retrace of the vertical deflection signal.

The junction of capacitor 80 and resistor 82 is also coupled through an isolating resistor 90 to the control grid of tube 65. The network 80, 82 and 90 provides regenerative feedback in the system during retrace only.

A degenerative network is coupled between the anode of tube 65 and the control grid thereof, and this is operative during trace. This network includes a series coupled capacitor 92 and resistor 94 coupled between the anode and ground. The junction of capacitor 92 and resistor 94 is connected through capacitor 96, resistor 98, variable resistor 100 and isolating resistor 102 to the control grid of tube 65. Resistor 102 is shunted by capacitor 105. The junction of resistors 100, 102 is coupled directly to the diode anode 110 which may be supported by the suppressor grid structure within the pentode 65 and is therefore shown connected directly to this suppressor. The anode 110 functions with the cathode of tube 65 to provide a diode which furnishes a charging path for the capacitors 92, 96 during retrace. A separate diode may also be used although it is advantageous to have one tube with a pentode section and the simple diode section.

The junction of capacitor 96 and resistor 98 is coupled through a discharging resistor 115 to the arm of a potentiometer 117. Potentiometer 117 is series coupled with resistor 120 between B+ and ground. Potentiometer 117 is variable to form a hold or frequency control for the system and this establishes the voltage toward which the sawtooth producing capacitors 92, 96 discharge during the trace portion of a generated signal.

*Operation of the signal generator 50 in Fig. 1*

During the scan or trace portion of the waveform the capacitors 92, 96 are discharging, essentially through discharging resistor 115 and a portion of potentiometer 117, which raises the potential at the control grid of tube 65 as shown by waveform 125. This, of course, increases the conduction of tube 65 which lowers its plate voltage as shown by waveform 130. Accordingly, as the grid side of the degenerative feedback network incorporating capacitors 92, 96 discharges, the anode side of this network has a decreasing voltage supplied to it thus forming a feedback or operational amplifier. The discharge of these capacitors is therefore what might be termed "series aiding" which tends to produce a constant current flow in them thereby linearizing the trace portion of the sawtooth signal applied to the signal grid .

Due to the effect of the various other networks in the system and nonlinearities in a practical tube, the resistor 94 is coupled to the capacitors 92 and 96 to provide a discharge path which renders the feedback signal 135, which is developed at this point, somewhat parabolic in shape. In this way, the beginning of the feedback signal will have a fairly steep rate of change while the end will be somewhat flatter in order to compensate for current compression near zero bias of the tube due to the rounded knee portion of its characteristic curve.

It is contemplated that tube 65 will be operated essentially class A during scan that the transformer 72 together with the load provided by the deflection winding 52 will comprise primarily a resistive load at the scanning frequency, commonly 60 cycles per second in present day television receives. Ordinarily, the face of a cathode ray tube is somewhat curved and a so-called "cosine" yoke is used so that approximately a linear sawtooth current is needed for scanning purposes. However, there are certain nonlinearities in the yoke, transformer and tube so that a practical circuit generally requires the current in the primary winding of transformer 72 to have a somewhat increasing slope. A pentode, such as tube 65, tends to supply this with a comparatively linear drive signal which is provided by the operational amplifier-type system shown. This type of amplifier circuit is sometimes referred to as a Miller integrator circuit.

The system uses degenerative feedback during the scan portion of the signal for linearity and, in time sequence, utilizes regenerative feedback so that the system is self-oscillating in the absence of synchronizing pulses. Retrace or recycling of the signal generator starts when the rate of change of the current in the load decreases to such an extent that the stored energy of the transformer and yoke is released in a heavily damped ringing operation to produce the pulse or spike 140*a* of the output waveform 140. This can occur when the synchronizing pulse 144 is applied to the signal generator or when the diode anode 110 or the control grid of the pentode causes clamping at the grid electrode at approximately zero bias. At such time the tube is abruptly driven into cutoff by means of the pulse appearing in the waveform 148 developed at the junction of capacitor 80 and resistor 82. This high pass network serves to develop these pulses across resistor 82 and they are applied through isolating resistor 90 to the control grid to cause abrupt cutoff of the tube. Simultaneously, the diode section of tube 65, already in conduction, conducts through resistors 98 and 100 to form a charge path for the capacitors 92, 96. Resistor 100 may be made variable as an adjustment for charge current thus forming a linearity control. However, due to the great negative feedback in the system this adjustment may be unnecessary since the signal will be largely self-regulating to one of desired form.

Simultaneously with cutoff of tube 65 the anode voltage rises sharply due to the heavily damped ringing pulse which may develop over one thousand volts at the anode, and this provides a potential for the charge of capacitors 92, 96. As the sawtooth producing capacitors are charged by the diode, resistor 102 provides isolation of the conducting diode from the control grid of tube 65, the potential at which grid maintains the tube in cutoff condition at this time. The capacitor 105 shuting resistor 102 is for the purpose of eliminating contamination at the diode. This capacitor couples diode contamination to the control grid so that an amplified inverted version of the spurious signals appear at the anode of the pentode section of tube 65 for cancellation in the feedback circuit.

The grid potential is determined by the resultant of potentials occurring at the junction of capacitor 80, resistor 82 and capacitor 96, resistor 115. These two potentials are, in turn, applied through attenuator networks to the grid of tube 65. The attenuation is a compromise which goes along with the required isolation for the circuit, without resorting to special diodes with low forward impedances and infinite back impedances. As the regenerative feedback pulse 148 decays, the voltage at the anode of tube 65 also decays and the charging process of capacitors 92, 96 eventually stops. This occurs when the combined charge on capacitors 92, 96 develops a potential which just equals a specifically chosen potential on the trailing edge of the anode pulse. All during this preceding time the diode 110 is conducting and the diode plate has a potential which is approximately zero. The grid has been under the influence of a highly negative pulse originating at the junction of capacitor 80, resistor 82, but attenuated by the ratio of resistor 90 compared to resistor 102. As capacitors 92, 96 cease charging, the diode anode 110 drops below zero potential toward a negative value since the anode pulse of tube 65 is still falling at a fast rate. This means the grid still has not yet come out of the cutoff region. The tube 65 plate anode ceases falling at this fast rate just as the tube 65 grid reaches cutoff potential. By this time the anode 110 has acquired a negative voltage which is just equal to a value which puts the tube 65 grid at the cutoff point and the potential originating at the junction of capacitor 80 and resistor 90 rapidly reverts to a value close to zero and remains there all through trace time. The tube 65 grid now receives all its potential from the junction of capacitor 96, resistor 115 and it is always negative but reaches zero at the end of trace. The potentiometer 117 is set to allow a fixedly (ideally) amount of current to flow through resistor 115 during the time the capacitors 96, 92 are discharging (trace time) and this automatically provides a sawtooth potential change across those capacitors which is the basic requirement of a circuit of this type. The current flow through resistor 115 is not actually fixed because a certain change in potential is required at the junction of resistor 115, capacitor 96 to drive the tube 65 grid over its operating base i.e., from cutoff to zero bias. Adjusting potentiometer 117 adjusts the rate of current flow and thus adjusts the rate of potential change at the grid. It does not adjust absolute values of grid potential. Since the rate is changed without changing the absolute limits of grid potential, the frequency likewise changes and hence potentiometer 117 is a hold control.

During the trace portion of the signal the secondary of transformer 72 and the deflection winding 52 are isolated from the control grid by the relatively high impedance of the resistor 90. During retrace, as previously mentioned, the control grid is isolated from the anode 110 of the diode section of tube 65 by means of resistor 102. Accordingly, in the overall system feedback or regeneration to render the system self-oscillatory can be effected at the control grid of tube 65 which provides, through regulation of the bias and dynamic signals applied thereto, complete control of the generated signal. Furthermore, in a system of this type the screen grid may be maintained at ground for signal frequencies and the full B+ potential can be applied thereto to maintain efficient operation of the tube. The cathode may be directly grounded, as shown, thus providing further desirable practical operation of the system.

*Description of stabilization circuit*

As previously stated a potential on lead 67, which is connected to the control grid of tube 65, controls the drive and thus the amplitude of the developed signal, or size of the frame scanning wave. By means of the networks to be described, the vertical size can be maintained relatively constant despite changes in operating voltage or B+ in the system. This can conveniently be done by providing a compensated size control voltage in conjunction with a compensated voltage used in the line deflection system of the receiver.

The line or horizontal scanning system 29 includes a self-biasing network connected to the control grid of the horizontal output tube 32. This compresses the series input capacitor 160 through which the input drive signals 162 are applied, and the series connected suppressor resistor 164. The bias is developed across the voltage dependent resistor 170 which with capacitor 184 form the bias source. A voltage divider, consisting of potentiometer 175 and fixed resistor 177, is connected between point 45, at which appears the boost or bootstrap voltage, and ground. The arm of potentiometer 175 is coupled through the resistor 180 to the junction of resistor 166 and 170. This network accordingly tends to place a positive potential at the junction of these resistors. Capacitor 184 is coupled between a tap point of the horizontal output transformer 34 and the junction of resistors 166, 170 so that a portion of the horizontal output pulse is applied to voltage dependent resistor 170. Because resistor 170 is non-linear, the pulses applied thereto by capacitor 184 are effectively rectified to develop a negative voltage which over balances the positive voltage applied to the same point through resistor 180. This forms a negative base on which is stacked the signal from the horizontal oscillator. Under those conditions the horizontal output does not operate with a grid leak bias circuit. The horizontal output pulses are relatively amplitude sensitive to variations in B+ due to power line voltage changes and this produces a bias change on the tube 32 tending to counteract the effect of such a varation in B+.

The junction of resistors 166, 170 is coupled through the T filter network 190 to the control grid of tube 65. However, since the adjustment of potentiometer 175, which produces the desired horizontal stabilization and desirable stabilization of the aspect ratio, may not provide the optimum bias for tube 65, a further voltage dependent network is incorporated in the system. This modifying voltage is developed across the voltage dependent resistor 200 which is series connected with the voltage divider resistor 202 between point 45 (the bootstrap voltage) and ground. The size control potentiometer 70 is connected across resistor 200 and a variable arm of potentiometer 70 is coupled through the isolating resistor 210 to the control grid of tube 65. Accordingly, a desired positive voltage can be provided by the networks 200, 202, 70, 210 to be combined with a voltage from the line scanning system to produce the necessary bias for tube 65. It may be noted that resistor 200 is voltage dependent and that the positive potential developed thereacross will be stabilized in a similar manner as the negative voltage developed across resistor 170 is stabililized. Accordingly, the bias change of tube 65 will be dependent upon the change in horizontal output pulse amplitude as compared to a stabilized bootstrap voltage. Adjustment of potentiometer 70 provides size control for the vertical scanning system by varying the operating point and overall drive of tube 65.

In a sawtooth signal generator of practical construction component values were as follows:

| | |
|---|---|
| Capacitor 62 | 27 mmfd. |
| Pentode 65 | 6BQ5 (with diode anode supported by suppressor grid structure). |
| Transformer 72 | turns ratio 7 to 1, primary impedance 10,000 ohms @ 60 c.p.s. |
| Capacitor 75 | .007 mfd. |
| Resistor 76 | 100,000 ohms. |
| Capacitor 78 | .05 mfd. |
| Capacitor 80 | .01 mfd. |
| Resistor 82 | 100,000 ohms. |
| Resistor 90 | 1 megohm. |
| Capacitor 92 | .007 mfd. |
| Resistor 94 | 1 megohm. |
| Capacitor 96 | .007 mfd. |
| Resistor 98 | 220,000 ohms. |
| Resistor 100 | 100,000 ohms. |
| Resistor 102 | 1.5 megohms. |
| Capacitor 105 | 100 mmfd. |
| Resistor 115 | 820,000 ohms. |
| Potentiometer 117 | 100,000 ohms. |
| Resistor 120 | 220,000 ohms, |
| Resistor 166 | 1 megohm. |
| Resistor 170 | E-298-GD-A/269 Philips VDR or equivalent. |
| Potentiometer 175 | 2 megohms. |
| Resistor 177 | 330,000 ohms. |
| Resistor 180 | 2.2 megohms, |
| Capacitor 184 | 1500 mmf. |
| Potentiometer 70 | 2 megohms. |
| Resistor 200 | E-299-CC/342 Philips VDR or equivalent. |
| Resistor 202 | 1.5 megohms. |
| Resistor 210 | 3.3 megohms. |

It is also possible to incorporate a variable resistor in the screen grid circuit for tube 65 and to bypass this resistor with a suitable capacitor. This will provide variation of the tube drive and effective size control. (See, e.g. FIG. 3.) However, with this modifiaction it is preferable to connect resistor 120 between potentiometer 117 and the screen grid of tube 65. This is to maintain constant frequency as a size change is made and thus render the size control independent of the hold control. By varying the discharging limit potential for capacitors 92 and 96 in the same direction as the screen grid potential, a desired independence of size adjustment with frequency can be maintained.

*Description of vacuum tube of FIG. 2*

As previously indicated, diode-anode 110 of the tube 65 may be incorporated into the tube as part of the suppressor grid supporting structure. FIG. 2 shows an elevational view of a 6BQ5 tube with this modification. Diode-anode 110 is carried by suppressor grid supporting leads 240 which extend above the insulating disc 242 in the tube 65. The anode 110 is formed in an ellipse which surrounds a portion of the cathode 244 extending above the disc 242. The anode 246 is for the pentode section of the tube which is housed within an enclosing glass envelope 248. The anode 246 and one of the suppressor support leads 240 are connected to external base pins. Similarly, one of the screen grid support leads 250 and a control grid support lead 252 are connected to external base pins. The cathode 244 is supported by lead 254 and is also connected to an external pin. The necessary filament structure is not shown. It may be seen that this described tube structure involves but a relatively minor addition of the plate 110 to the already existing suport leads 240 for the suppressor grid. The only other necessary change in the tube of this type would be the connection of one of the leads 240 to an external pin of the tube base rather than directly to the cathode thereof as is commonly done internally of tubes of this type. It will be recognized that tubes of other types may be used in the system of the invention but the one described is preferred for use in the invention.

*Circuit description of FIG. 3*

In the modification of FIG. 3, the pentode vacuum tube 265 is connected in a sawtooth signal generator circuit wherein the tube operates an an operational feedback amplifier and regenerative feedback from the output circuit is applied to the screen grid of the tube.

Positive going sync pulses 267, which may be derived from the vertical or frame synchronizing components of a received television signal, are applied through a series connection of input capacitor 270, resistor 271 and capacitor 272 to the control grid of tube 265. The junction of resistor 271, capacitor 272 is connected to ground through capacitor 273. The cathode of tube 265 is directly connected to ground. A junction of the control grid and capacitor 272 is also coupled to ground through capacitor 274 and the elements 270–274 thus form an input filter or integrating network for wave shaping of the synchronizing pulses 267.

The anode of tube 265 is coupled through a degenerative feedback network to the control grid thereof. This network includes the series connection of capacitor 277, sistor 278, capacitor 279 and a portion of variable resistor 280 and isolating resistor 281. The junction of capacitor 279 and resistor 278 is connected through resistor 283 to ground. The junction of resistors 280 and 281 is connected through resistor 285 to the arm of a potentiometer 284 having a fixed resistor portion coupled between B+ and ground. Diode 286 includes an anode connected to the junction of resistors 280 and 281 and a cathode directly connected to ground.

Output signals are derived by means of the output transformer 288 which includes a primary winding having a first portion coupled between the anode of tube 265 and B+. The secondary winding of transformer 288 is adapted to be connected to a deflection yoke having a field deflection winding such as winding 52 in the circuit of FIG. 1.

An extended portion of the primary winding of transformer 288 is used to develop regenerative feedback signals for self-oscillation of the signal generator. One end of this winding portion is coupled to B+ and the other end thereof is connected through capacitor 292 and resistor 293 to the screen grid of tube 265. A fixed resistor 295 and a portion of the variable resistor 297 are connected across capacitor 292. A filter network comprising capacitor 298 series connected with resistor 299, which is shunted by capacitor 300, is connected between the screen grid of the tube and ground.

*Operation of the circuit of FIG. 3*

The operation of the modified circuit of FIG. 3 is much the same as that of the circuit of FIG. 1 except that the regenerative feedback in the system is between anode and screen grid rather than between anode and control grid. The system of FIG. 3 therefore requires a somewhat stronger feedback signal since it is applied to a less sensitive grid of the tube.

During the trace or scan portion of the developed signal, capacitors 277 and 279 discharge primarily through resistor 285, and a portion of potentiometer 284. This increases the potential at the control grid of tube 265 thereby increasing conduction in the tube and lowering the anode voltage. Therefore, the anode side of network 277–279 is lowered and the system functions as an operational amplifier. This tends to linearize the trace portion of the output signal 305 which is applied to the secondary winding of transformer 288 and coupled to a suitable deflection yoke winding for utilization.

When the potential of the control grid of tube 265 has increased sufficiently, or when the synchronizing signal 267 is applied to this grid, or at the time when both of these conditions occur, retrace or recycling of the signal generator commences when the rate of change of current in the transformer 288 and its associated deflection yoke decreases and the stored energy in this inductive circuit is released. At this time a portion of a heavily damped ringing signal so developed is applied through capacitor 292 and resistor 293 to the screen grid of tube 265 with a polarity to cause reduced conduction of this tube. The various resistor capacitor elements connected in this screen grid feedback circuit serve to modify the feedback waveform so that it has a desirable wave shape to cause abrupt cutoff of tube 265. Variable resistor 297 may be used to control the screen grid potential to thereby regulate the effective amplitude in the output signal or the vertical size of a TV raster produced by the system.

As the tube 265 is cutoff in the regenerative phase, the capacitors 277, 279 will charge through diode 286 and this charging operation will be effectively isolated from the control grid of tube 265 by means of resistor 281. The charging of capacitors 277, 279 will be stopped when the anode voltage of tube 265 has, upon reversal of the ringing signal, decayed approximately to the potential at the arm of potentiometer 284. Simultaneously the potential at the screen grid of tube 265 is also increasing as capacitors 277 and 279 commence to discharge through the potentiometer 284, and this will result in renewed tube conduction when the proper electrode potentials are thus established on the control and screen grids. Potentiometer 284 forms a frequency or hold control for the system when used as a vertical signal generator by effectively setting the time at which the start of the scanning portion of the signal begins. Also, resistor 280 may be varied as a linearity control by adjusting the discharge current of the feedback capacitor, particularly during the early part of the scan portion of the signal.

It may be observed that diode 286 performs the same function in the circuit of FIG. 3 as the diode (having anode 110) does in the circuit of FIG. 1. This diode 286 may, of course, be built into the structure of tube 265 in a way similar to the diode-pentode structure of tube 65. It should be noted that positive going synchronizing signals are utilized in the circuit of FIG. 3 (synchronizing pulses 267) and in ths form the system is triggered to recycling or rescanning by means of grid clamping followed by cutoff of the tube through feedback of a ringing signal. This is by way of comparison to the system of FIG. 1 in which there is cutoff of the tube by means of a negative going synchronizing signal applied to the control grid.

This invention provides, therefore, an improved signal generator system for producing signals of controlled waveform. The system is particularly useful in the vertical deflection circuitry of a television receiver wherein the use of a single tube frame deflection system is advantageous from the cost standpoint. Furthermore, it should be apparent in the system of the type described a waveform of desired shape may be produced by circuitry which is relatively stable and independent of minor variations in circuit parameters.

We claim:

1. In a television receiver, the vertical deflection system for generating sawtooth signals having trace and retrace portions, including in combination, an operational amplifier circuit having a single electron valve with input and output electrodes, an output circuit coupled to said output electrode, a passive degenerative resistor-capacitor wave forming network coupled from said output and input electrode circuit to said operative at the frequency of the trace portions of the signals to release stored energy and causing increased conduction of said electron valve, a passive regenerative network coupled between said output circuit and said input electrode and operative at the frequency of the retrace portions of the signals, impedance means exclusive of said control electrode for isolating said regenerative network and said waveforming network, and switch means operative during the retrace portions of the signals for conducting current to said passive wave forming network to restore energy thereto and form a self-oscillating system.

2. In a television receiver, the vertical deflection system for generating sawtooth signals having trace and retrace portions, including in combination, an operational amplifier circuit having a single pentode electron valve with cathode, anode and first through fifth grids, an output circuit connected to said anode and adapted to ring for the retrace interval, a passive wave forming network coupled between said anode and said first grid and operative at the frequency of the trace portions of the signals to provide an increasing potential at said first grid and increasing current in said output circuit, a passive regenerative network coupled between said output circuit and said first grid and operative at the frequency of the retrace portions of the signals to apply cutoff pulses to said first grid, resistor means for isolating said regenerative network and said waveforming network, and a further anode in said electron valve and operative with said cathode, said further anode being coupled to said wave forming network for conducting current thereto in response to ringing in said output circuit during said retrace portions of the signals.

3. A signal generating circuit to produce signals having trace and retrace portions, including in combination, a single electron valve having control and output electrode means, an output load and energizing circuit coupled to said output electrode means and including inductance means to release stored energy during the retrace portions of the signals, a degenerative feedback network connected between said output and control electrode means and including capacitor means to be discharged to establish a controlling waveform at said control electrode means to increase conduction of said electron valve during the trace portions of the signals thereby forming an operational amplifier circuit, a passive regenerative feedback network connected between said output load and said control electrode means for regeneratively coupling the retrace portions of the signals to said control electrode for cutting off said electron valve, and diode means coupled to said degenerative feedback network for charging said capacitor means during the retrace portions of the signals in response to energy released by said inductor means.

4. In a television receiver having a cathode ray beam reproducing system with line scanning means to produce horizontal deflection signals, a sweep signal generating circuit to produce vertical scanning signals having trace and retrace portions, including in combination, a single electron valve having control and output electrodes, an output load and energizing circuit coupled to said output electrode and including inductance means to release stored energy during the retrace portions of the signals, a degenerative feedback network connected between said output and control electrodes and including capacitor means to be discharged for establishing a controlling waveform at said control electrode to increase conduction of said electron valve during the trace portions of the signals, a passive regenerative feedback network connected between said output load and said control electrode for coupling the retrace portions of the signals to said control electrode with a polarity for cutting off said electron valve, means coupled to said degenerative feedback network for charging said capacitor means in response to the retrace portions of the signals and a voltage divider network coupled to said control electrode for biasing the same, said voltage divider network including means coupled to the line scanning means for sensing a change in amplitude of the horizontal deflection signals and changing the bias on said control electrode in opposition thereto.

5. A signal generating circuit to produce sawtooth signals having trace and retrace portions, including in combination, a single vacuum tube having a cathode, a control grid, a screen grid, and an anode, an output transformer coupled to said anode, means for applynig a direct current energizing potential to said transformer and said screen grid for energizing said anode and screen grid with respect to said cathode, a passive degenerative feedback network coupled to said anode, an isolating resistor coupling said degenerative feedback network to said control grid, a regenerative feedback network coupled between said transformer and said control grid to apply cutoff pulses to said control grid in response to the retrace portions of the signals, and a clamping diode coupled to the interconnection of said degenerative feedback network and said isolating resistor, said degenerative feedback network having capacitor means coupled between said anode and said isolating resistor and chargeable through said diode upon regenerative feedback of the retrace portions of the signals and voltage divider resistor means coupled to said capacitor means and said cathode to provide a discharge path for said capacitor means and a potential to increase conduction of said tube during the trace portions of the sawtooth signals.

6. A sweep signal generator for a television receiver for generating vertical scanning signals having trace and retrace portions, including in combination, a single vacuum tube having a cathode, a control grid, a screen grid, and an anode, an output transformer coupled to said anode and adapted to be coupled to a beam deflection yoke in the receiver, said transformer and the deflection yoke comprising a load which is primarily resistive at the frequency of the trace portions and inductive at the frequency of the retrace portions, means for applying an energizing potential to said transformer and to said screen grid for energizing the same with respect to said cathode, capacitor means coupled to said anode, resistor means coupled between said capacitor means and said control grid, a potential divider coupled to said resistor means and providing a potential positive with respect to said cathode so that discharge of said capacitor means thereto increases the conduction of said vacuum tube during the trace portions of the signals, diode means having an anode coupled to said resistor means at a point remote from said control grid to provide a charging path for said capacitor means with a portion of said resistor means isolating said diode means from said control grid, and means for developing pulses at the retrace frequency coupled between said transformer and said control grid to provide regenerative feedback so that cessation of the increase in conduction of said vacuum tube causes release of the stored energy in said transformer for applying cutoff pulses to said control grid and so that said capacitor means recharges through said diode means in response to release of the stored energy to said capacitor means.

7. A sweep signal generator for a television receiver for generating vertical scanning signals having trace and retrace portions, including in combination, a pentode vacuum tube having a cathode, a control grid, a screen grid, a suppressor grid, and an anode, an output transformer coupled to said anode and adapted to be coupled to a beam deflection yoke in the receiver, said transformer comprising a load which is primarily resistive at the frequency of the trace portions and inductive at the frequency of the retrace portions, means for applying an energizing potential to said transformer and to said screen grid for energizing the same with respect to said cathode, capacitor means coupled to said anode, resistor means coupled between said capacitor means and said control grid, a potential divider coupled to said resistor means and providing a potential positive with respect to said cathode so that discharge of said capacitor means thereto increases the conduction of said vacuum tube during the trace portions of the signals, a diode anode supported in said tube with said suppressor grid, said diode anode being coupled to said resistor means at a point remote from said control grid to provide a charging path for said capacitor means with a portion of said resistor means isolating said diode anode from said control grid, means for developing pulses at the retrace frequency coupled between said transformer and said control grid to provide regenerative feedback so that cessation of the increase in conduction of said vacuum tube causes release of the stored energy in said transformer for applying cutoff pulses to said control grid so that said capacitor means recharges through said diode anode, and means for synchronizing the production of scanning signals with television signals.

8. A sweep signal generator for a television receiver for generating vertical scanning signals having trace and retrace portions, including in combination, a pentode vacuum tube having a cathode, a control grid, a screen grid, a suppressor grid, and an anode, an output transformer coupled to said anode and adapted to be coupled to a beam deflection yoke in the receiver, said transformer comprising a load which is primarily resistive at the frequency of the trace portions and inductive at the frequency of the retrace portions, means for applying an energizing potential to said transformer and to said screen grid for energizing the same with respect to said cathode, a variable size control potential divider coupled to said control grid for biasing the same, capacitor means coupled to said anode, resistor means coupled between said capacitor means and said control grid, a variable hold control potential divider coupled to said resistor means and providing a potential positive with respect to said cathode so that discharge of said capacitor means thereto increases the conduction of said vacuum tube during the trace portions of the signals, a diode anode supported in said tube with said suppressor grid, said diode anode being coupled to said resistor means at a point remote from said control grid to provide a charging path for said capacitor means with a portion of said resistor means isolating said diode anode from said control grid, means for developing pulses at the retrace frequency coupled between said transformer and said control grid to provide regenerative feedback so that cessation of the increase in conduction of said vacuum tube causes release of the stored energy in said transformer for applying cutoff pulses to said control grid so that said capacitor means recharges through said diode anode, and means for applying negative going television synchronizing signals to said control grid.

9. In a television receiver including a cathode ray tube and line scanning means to produce horizontal deflection signals and a boosted B+ potential for the tube, a signal generating circuit to produce vertical scanning signals having trace and retrace portions, including in combination, an operational amplifier circuit having a single pentode electron valve with cathode, anode and first through fifth grids, an interconnected energy storing output circuit and passive wave forming network coupled respectively to said anode and said first grid and operative at the frequency of the trace portions of the signals to provide an increasing potential at said first grid and increasing current in said output circuit, a regenerative network coupled between said output circuit and said first grid and operative at the frequency of the retrace portions of the signals to apply cutoff pulses to said first grid, resistor means for isolating said regenerative network and said waveforming network, diode means coupled to said wave forming network for conducting current thereto in response to said retrace portions of said signals, and release of energy by said output circuit and a potential comparison network coupled to said first grid to provide bias for said electron valve, said potential comparison network including voltage dependent resistor means energized by the boosted B+ potential and the horizontal deflection signals for rectifying such horizontal deflection signals and comparing the rectified potential to the boosted B+ potential thereby providing a stabilizing bias for said signal generating circuit.

10. A signal generating circuit to produce signals having trace and retrace portions, including in combination, a single vacuum tube having grid and anode means, an output load and energizing circuit coupled to said anode means and including inductor means to release stored energy during the retrace portions of the signals, a passive degenerative feedback network connected between said anode and grid means and including capacitor means to be discharged for establishing a control waveform at said grid means to increase conduction of said tube during the trace portions of the signals thereby forming an operational amplifier circuit, said degenerative feedback network also including resistor means coupled between said capacitor means and said grid means, a passive regenerative feedback network connected between said output load and said grid means for regeneratively coupling the retrace portions of the signals to said grid means for cutting off said electron valve, and diode means coupled between a reference point and the interconnection of said resistor means and said capacitor means for charging said capacitor means in response to the retrace portions of the signals and energy release of said inductor means.

11. A signal generating circuit to produce signals having trace and retrace portions, including in combination, a single vacuum tube having grid and anode means, an output load and energizing circuit coupled to said anode means and including inductor means to release stored energy during the retrace portions of the signals, a passive degenerative feedback network connected between said anode and grid means and including capacitor means and a variable potentiometer for establishing a control waveform at said grid means to increase conduction of said tube upon discharge of said capacitor means during the trace portions of the signals thereby forming an operational amplifier circuit, said degenerative feedback network also including resistor means coupled between said capacitor means and said grid means, a passive regenerative feedback network connected between said output load and said grid means for regeneratively coupling the retrace portions of the signals to said grid means for cutting off said electron valve, variable resistor means for establishing the potential of said grid means, and diode means coupled between a reference point and the interconnection of said resistor means and said capacitor means for charging said capacitor means in response to the retrace portions of the signal and energy release of said inductor means.

12. A sweep signal generator for a television receiver for generating vertical scanning signals having trace and retrace portions, including in combination, a single pentode vacuum tube having a cathode, a control grid, a screen grid, a suppressor grid, and an anode, an output transformer coupled to said anode and adapted to be coupled to a beam deflection yoke in the receiver, said transformer and the deflection yoke comprising a load which is primarily resistive at the frequency of the trace portions and inductive at the frequency of the retrace portions, said transformer having a regenerative feedback winding coupled to said screen grid, circuit means for energizing said screen grid and said anode with respect to said cathode and including a variable size control resistor coupled to said screen grid for adjusting the potential thereof, capacitor means coupled to said anode, resistor means coupled between said capacitor means and said control grid, a variable hold control potential divider coupled to said resistor means and providing a potential positive with respect to said cathode so that discharge of said capacitor means thereto increases the conduction of said vacuum tube during the trace portions of the signals, diode means coupled from a reference point to said resistor means at a point remote form said control grid to provide a charging path for said capacitor means with a portion of said resistor means isolating said diode anode from said control grid, means for applying synchronizing pulses to said control grid so that cessation of the increase in conduction of said vacuum tube causes release of the stored energy in said transformer and regenerative cutoff pulses at said screen grid and so that said capacitor means recharges through said diode anode in response to release of the stored energy.

13. In a television receiver, the vertical deflection system for generating sawtooth signals having trace and retrace intervals, including in combination, an operational amplifier circuit having a single electron valve with at least input and output electrodes, output circuit means connected to said output electrode and adapted to ring for the retrace interval of said sawtooth signals, a passive wave-forming network coupled to said input electrode and operable at the frequency of the trace interval of said tawtooth signals to release stored energy and provide a time varying input signal for increasing conduction of said electron valve, a passive regenerative network coupled between said output circuit means and said input electrode and operative during the retrace interval of said sawtooth signals to apply cutoff pulses to said electron valve, mean exclusive of said input electrode and connected to said input electrode and to said networks for isolating said regenerative network and said waveforming network, and switch means operative during the retrace interval of said sawtooth signals for conducting current to said passive waveforming network and restoring energy therein, thereby forming a self-oscillating system.

14. In a television receiver, the vertical deflection system for generating a sawtooth wave having trace and retrace portions, including in combination, amplifier circuit means having signal degeneration means for providing a substantially linear trace portion of said sawtooth wave in response to a time varying input signal, said amplifier circuit means including a single electron valve having at least input and output electrodes, an output load and energizing circuit coupled to said output electrode and including inductance means to release stored energy during the retrace portion of said sawtooth wave, a passive wave-shaping network including resistance-capacitance means coupled to said input electrode and having a time-constant operable at the frequency of the trace portion of said sawtooth wave to supply a time varying signal to thereby control the conduction of said electron valve during the trace portion of said sawtooth wave, a passive feedback network connected between said output load and said input electrode for regeneratively coupling the retrace portion of said sawtooth wave to said input electrode for abruptly changing the conduction of said electron valve at the end of the trace portion of said sawtooth wave, means for providing circuit isolation between said wave-shaping network and said feedback network, and diode means coupled to said input electrode for changing the level of said wave-shaping network during the retrace portion of said sawtooth wave.

15. In a television receiver, the vertical deflection system for generating a sawtooth wave having a trace portion and a retrace portion, including in combination, amplifier means including a single electron valve having signal degeneration means for providing a substantially linear trace portion of said sawtooth wave in response to a time varying input signal, said amplifier means including a single electron valve having at least anode and and control grid electrodes, an output load and energizing circuit coupled to said anode electrode and including inductive means to release stored energy during the retrace portion of said sawtooth wave, a wave shaping network connected to said control grid electrode including capacitance means adapted to be discharged for applying a time varying signal thereto, said time varying signal increasing conduction of said electron valve during the trace porton of said sawtooth wave, a passive regenerative feedback network connected between said output load and said control grid electrode for coupling the retrace portion of said sawtooth wave to said control grid electrode with a polarity for cutting-off said electron valve, means for providing circuit isolation of said regenerative feedback network and said wave-shaping network, switch means operative during the retrace portion of said sawtooth wave for charging said capacitance means, and means coupled to said control grid electrode for establishing quiescent bias of said electron valve.

References Cited by the Examiner

UNITED STATES PATENTS 2,924,746 2/60 Claypool -------------- 315—27

DAVID G. REDINBAUGH, *Primary Examiner.*